United States Patent
Johnson

(10) Patent No.: US 7,941,594 B2
(45) Date of Patent: May 10, 2011

(54) SDRAM SHARING USING A CONTROL SURROGATE

(75) Inventor: Mark Johnson, South Elgin, IL (US)

(73) Assignee: Freescale Semiconductor, Inc., Austin, TX (US)

(*) Notice: Subject to any disclaimer, the term of this patent is extended or adjusted under 35 U.S.C. 154(b) by 752 days.

(21) Appl. No.: 11/859,696

(22) Filed: Sep. 21, 2007

(65) Prior Publication Data
US 2009/0083565 A1 Mar. 26, 2009

(51) Int. Cl.
*G06F 13/42* (2006.01)
(52) U.S. Cl. .................................. 711/105; 711/154
(58) Field of Classification Search .................. 711/105, 711/154; 713/400
See application file for complete search history.

(56) References Cited

U.S. PATENT DOCUMENTS

| | | | |
|---|---|---|---|
| 5,907,862 A | 5/1999 | Smalley | |
| 5,930,502 A | 7/1999 | Picco et al. | |
| 6,499,087 B1 | 12/2002 | Fadavi-Ardekani et al. | |
| 6,891,543 B2 | 5/2005 | Wyatt | |
| 2006/0236007 A1* | 10/2006 | Matulik | 710/107 |

* cited by examiner

*Primary Examiner* — Yong Choe

(57) ABSTRACT

A system and method for sharing a single synchronous dynamic random access memory (SDRAM) unit between two chips, each having an SDRAM controller. Each SDRAM controller is effectively divided into a control block and a data block. The first SDRAM controller drives or reads directly from the SDRAM unit's data bus instead of employing a dedicated data bus for communication between the first and second SDRAM units. The data section of the second SDRAM controller responds to requests from the first SDRAM controller as if the requests had come from the second SDRAM controller's own control block. In other embodiments of the present invention, the second SDRAM controller can accept control signals generated by the first SDRAM. If the second SDRAM controller detects that the first SDRAM controller is initiating a request, the second SDRAM controller terminates any active requests of its own using burst termination. Thereafter, the second SDRAM controller processes the first SDRAM controller's request with the SDRAM unit as appropriate.

20 Claims, 10 Drawing Sheets

SDRAM SHARING USING A CONTROL SURROGATE

FIELD OF THE INVENTION

The present invention relates generally to synchronous dynamic random access memory (SDRAM) control. More specifically, the present invention relates to sharing a single SDRAM between two chips by utilizing one of the two chips as a control surrogate.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Many of today's electronic devices, such as computers, utilize processors that must access memory in order to operate. Fast and efficient access to that memory has thus become an important consideration in the design of those electronic devices. Static random access memory (SRAM) is one type of semiconductor memory, where the memory retains its contents as long as power remains applied. Dynamic random access memory (DRAM) is a type of random access memory that stores each bit of data in a separate capacitor. Because capacitors are not ideal elements, the information eventually fades unless the capacitor charge is periodically refreshed. The refresh rate is specified by manufacturers to be a certain number of milliseconds, in accordance with recommendations set by the Joint Electron Device Engineering Council (JEDEC), a semiconductor engineering standardization body. It is this refresh requirement that makes DRAM dynamic, and more complicated due to the refresh logic needed, as opposed to SRAM. However, DRAM has an advantage over SRAM in that it is structurally more simple. Whereas six transistors are needed per bit in SRAM, only one transistor and a capacitor are required per bit in DRAM. This allows DRAM to reach very high density.

DRAM is usually arranged in a square array of one capacitor and transistor per cell, where modern DRAM can be comprised of thousands of cells in length/width. In a read operation, the row of a selected cell is activated, turning on the transistors and connecting the capacitors of that row to the sense lines. The sense lines lead to the sense amplifiers, which discriminate between a stored 0 or 1. The amplified value from the appropriate column is then selected and connected to the output. At the end of a read cycle, the row values must be restored to the capacitors which were depleted during the read. This write is done by activating the row and connecting the values to be written to the sense lines, which charges the capacitors to the desired values. During a write to a particular cell, the entire row is read out, one value is changed, and then the entire row is written back in.

There are currently various types of DRAM. Some types of DRAM utilize an asynchronous interface, meaning that the DRAM reacts immediately to changes detected in its control inputs. Synchronous DRAM (SDRAM) on the other hand, has a synchronous interface, meaning that the SDRAM waits for a clock signal before responding to its control inputs. Therefore the SDRAM is synchronized with, for example, a computer's system bus, and thus with a controlling processor. The clock is used to drive an internal finite state machine that can pipeline incoming commands. This allows a chip accessing the SDRAM to have a more complex pattern of operation than DRAM.

Pipelining refers to a chip's operation, where that chip can accept a new command before it has finished processing the previous one. In a pipelined write, the write command can be immediately followed by another command without waiting for the data to be written to the memory array of the SDRAM. In a pipelined read, the requested data appears a fixed number of clock pulses after the read command, and it is not necessary to wait for the data to appear before sending the next command. This creates a delay called latency, and is an important consideration when utilizing SDRAM.

Oftentimes, a plurality of different processors and controllers in one device require access to a single SDRAM unit. A common example is a computer that utilizes a keyboard interface controller, a mouse controller, serial and parallel port controllers, a floppy disk controller, and a hard drive disk controller. Conventional technology for sharing a single SDRAM generally involves assigning two processors or controllers as masters of the single SDRAM. Unfortunately, SDRAM units are very hard to manage with two masters. Other conventional technology propose employing additional circuitry or logic in the form of arbiters and switches to allow more than one processor or controller to access a single SDRAM, as well as assigning higher status to one processor or controller over another. This, however, complicates the system and leads to possible wasted cycles and complicates the timing of when the SDRAM can be accessed. Still other conventional technology requires a time-division scheme of accessing a single SDRAM or caching portions of memory for use by the multiple processors or controllers.

DETAILED DESCRIPTION OF THE PREFERRED EMBODIMENTS

Figure 1:
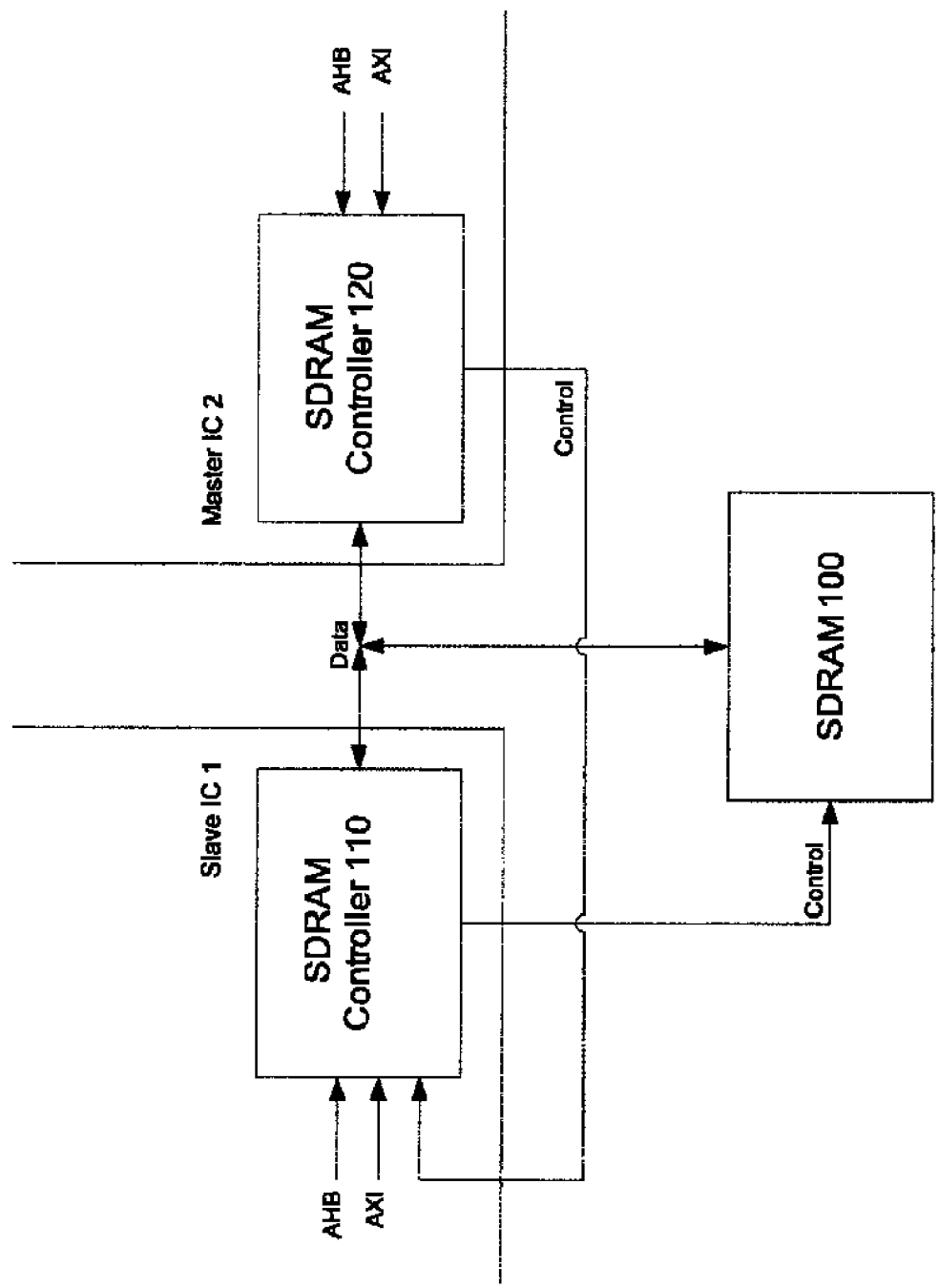
FIG. 1 is a block diagram of an electronic circuit according to various embodiments of the present invention.

Various embodiments of the present invention comprise a system and method of sharing a single SDRAM unit between two chips, each having an SDRAM controller. Each SDRAM controller is effectively divided into a control block and a data block. In one embodiment of the present invention, the control block of the first SDRAM controller is not used or is left off, and requests from the first SDRAM controller are sent to the second SDRAM controller that passes the request to the SDRAM unit. The first SDRAM controller drives or reads directly from the SDRAM unit's data bus instead of employing a dedicated data bus for communication between the first and second SDRAM units. The data section of the second SDRAM controller responds to requests from the first SDRAM controller as if the requests had come from the second SDRAM controller's own control block. In other embodiments of the present invention, the second SDRAM controller can accept control signals generated by the first SDRAM. If the second SDRAM controller detects that the first SDRAM controller is initiating a request, the second SDRAM controller terminates any active requests of its own using burst termination. Thereafter, the second SDRAM controller processes the first SDRAM controller's request with the SDRAM unit as appropriate. To address any latency issues, the first SDRAM controller's clock frequency can be decreased while the data is buffered. Alternatively, the SDRAM unit's clock frequency is decreased, allowing the first SDRAM controller to drive the data input/output directly. Lastly, the first SDRAM controller can treat the SDRAM unit as a double data rate SDRAM.

Sharing a single SDRAM unit between two SDRAM controllers reduces system cost and allows direct chip-to-chip communication. In particular, partitioning an SDRAM controller into control and data blocks allows for the efficient driving and reading of data regardless of whether the SDRAM control is driven by its own control block or an off-chip SDRAM controller. SDRAM unit refreshes can be maintained by one central SDRAM controller. Such a configuration is easier to manage than if control of the SDRAM unit was spread across two separate SDRAM controllers. In addition, more flexibility and value is obtained when the sharing of the SDRAM unit is hidden from one of the two SDRAM controllers, as any SDRAM controller or chip with a standard SDRAM interface could be used in the configuration. Furthermore, the various embodiments of the present invention allow a device to benefit from the low cost per bit of high density RAM, even though its memory requirements alone would not justify using high density RAM. Lastly, less physical space is needed when only a single SDRAM unit is utilized, as opposed to two SDRAM units, i.e., one for each SDRAM controller or chip.

In various embodiments of the present invention, an SDRAM controller is partitioned into data and control blocks. The control block drives the clock and the control of the SDRAM. The data block receives the clock from the control section, a signal(s) from the control section used to identify when data is ready to be read or written into the SDRAM, and the actual data lines from the SDRAM. Given this partitioning, two chips can share an SDRAM. In order to share an SDRAM, instead of a single SDRAM controller driving the SDRAM directly, the SDRAM controller sends its request to a surrogate SDRAM controller. The surrogate SDRAM controller then passes the SDRAM request along to the SDRAM in due time. Furthermore, the interface of an SDRAM was designed to be point-to-point, and the configurations of the various embodiments of the present invention serve to reinforce this design.

In FIG. 1, it is assumed that a first SDRAM controller 110 receives control from a second SDRAM controller 120, and the first SDRAM controller 110 control is used to drive the SDRAM 100. The first SDRAM controller 110 treats the second SDRAM controller 120 request in a manner similar to an on-chip request from a system bus, such as an Advanced eXtensible interface (AXI) address channel signal bus or an Advanced High-performance Bus (AHB). However, instead of also having a dedicated data bus going between the first SDRAM controller 110 and the second SDRAM controller 120, the second SDRAM controller 120 drives or reads directly from the SDRAM 100 data bus. This reduces operating speed and reduces input/output (I/O) count. When the second SDRAM controller 120 issues the first SDRAM controller 110 request, the second SDRAM controller 120 informs the first SDRAM controller 110 using some type of sideband signaling, and the data block of the first SDRAM controller 110 responds in the same way as if the request had been issued by its own control block.

Figure 2:
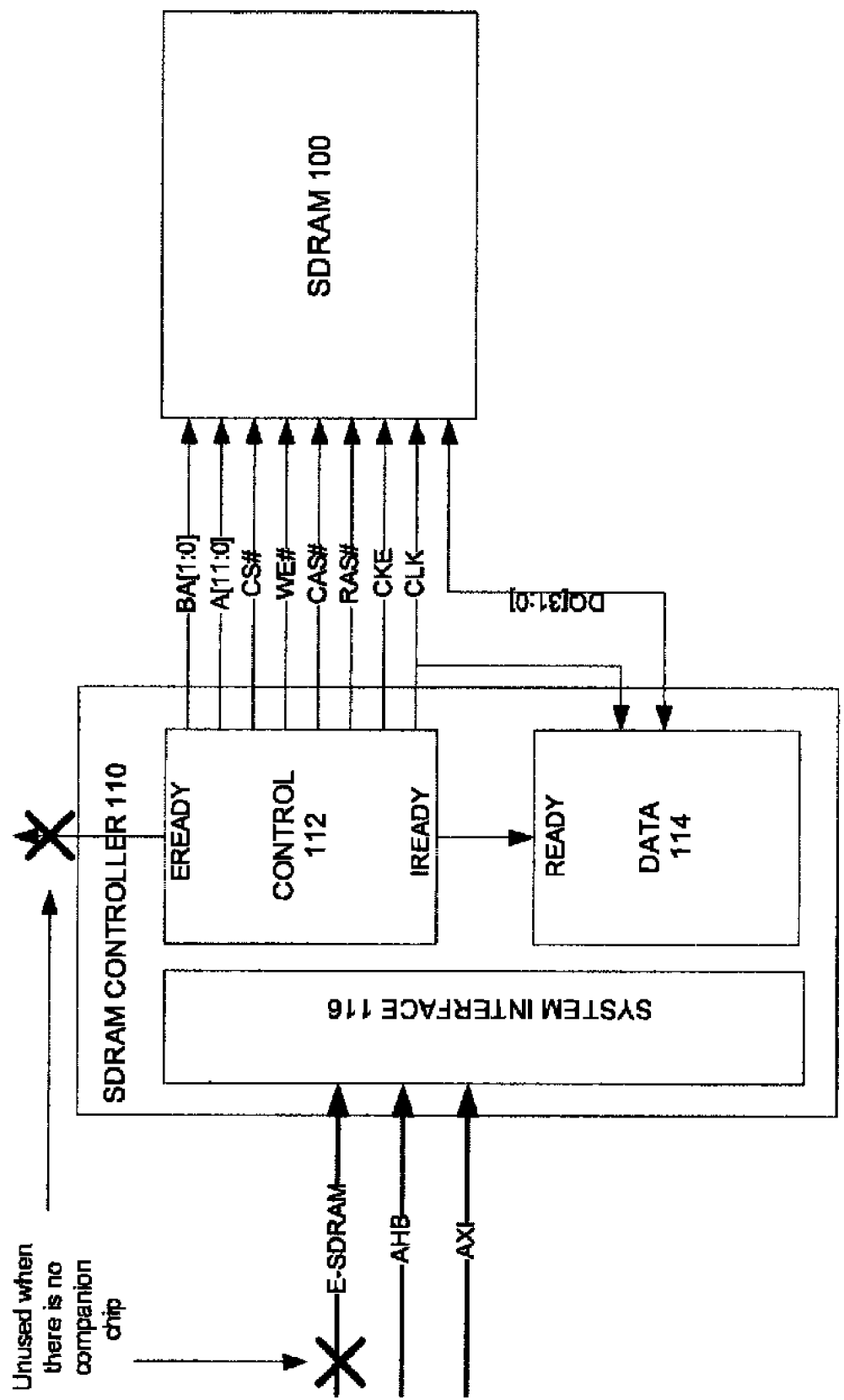
FIG. 2 is a schematic circuit diagram of an SDRAM controller.

FIG. 2 shows a schematic diagram of the standard first SDRAM controller 110 partitioned into control and data blocks discussed above. A control block 112 is always designated as the master block, while a data block 114 and the data I/O paths act as slaves to the control block 112. The control block 112 drives the system clock. As discussed above, an SDRAM is based on a finite state machine operation. In addition, inputs to an SDRAM are latched by a system clock. The control block 112 also drives the SDRAM 100 control signals. The SDRAM 100 control signals include BA[1:0], A[11:0], CS#, WE#, CAS#, RAS#, CKE, and CLK and are explained as follows: A system clock (CLK) signal is provided through a CLK input pin and a clock enable signal (CKE) is provided though a CKE input pin to the SDRAM 100. The CLK signal is activated and deactivated based on the state of the CKE signal. All of the input and output signals are synchronized to the rising edge of the CLK signal. A chip select (CS) input pin inputs a CS signal which enables, when low, and disables, when high, a command decoder (not shown), which in turn receives control signals including a row address select/strobe (RAS) signal on a RAS pin, column address select/strobe (CAS) signal on a CAS pin, and a write enable (WE) signal on a WE pin. The command decoder decodes the various signals in order to control the various circuitry of SDRAM 100 based on decoded commands.

It should be noted that the CS signal is used to let a specific chip know that the commands coming in over the bus are intended for it, and not another chip. In addition, when a row is active, a user can strobe column addresses to it without having to repeat the row address, which allows data to be "burst" from those columns onto the bus, one column after another.

A bank address (BA) signal is provided on a BA[x-1:0] input pin to define which bank array, discussed in more detail below, should be operated on by certain commands. Address inputs bits are provided on input pins A[y-1:0]. As will also be described below, both the row and column address input bits are provided on the address input pins. During write transfer operations, data is supplied to the SDRAM device 100 via I/O pins (DQ[31:0]). During read transfer operations, data is clocked out of the SDRAM device 100 via the same I/O pins. It should be noted that the various numbers of bank arrays used and various number of rows and columns an array may be subdivided into are possible depending on one's requirements.

An additional poll is added to the system interface 116 of the first SDRAM controller 110, which is designated as E-SDRAM. This E-SDRAM port accepts requests from an external SDRAM controller, such as second SDRAM controller 120. Moreover, the E-SDRAM port is designed to be similar to an AXI, AHB, or any other on-chip bus port. An associated E-SDRAM interface is preferably configured to be able to receive standard SDRAM control signals, such as those discussed above, i.e., BA[1:0], A[11:0], CS#, WE#, CAS#, RAS#, CKE, and CLK. It should be noted, however, that the E-SDRAM interface can also be configured to interface with any other standard bus or as a custom, optimized interface.

Figure 3:
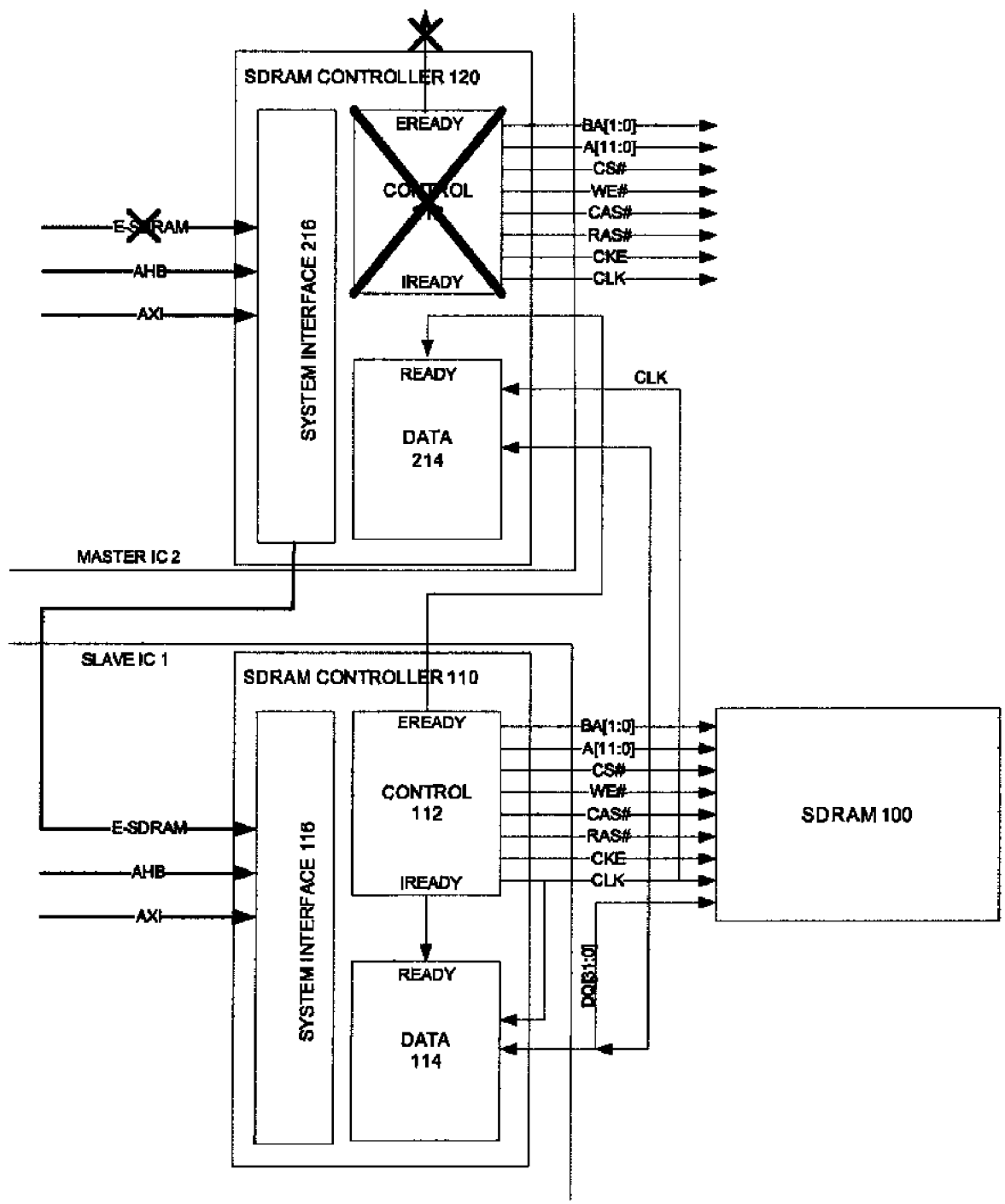
FIG. 3 is a schematic circuit diagram showing the interaction between a master SDRAM controller and a slave SDRAM controller according to one embodiment of the present invention.

As shown if FIG. 3, when the SDRAM 100 is shared by the first and second SDRAM controllers 110 and 120, each residing on slave integrated circuit (IC) chip 1 and master IC chip 2, respectively, the master IC chip 2 SDRAM requests are collected and forwarded to the slave IC chip 1. A control block 212 of the master IC chip 2 is unused. It should be noted that in one embodiment of the present invention, it is possible to simply leave the control block 212 off the second SDRAM controller 120 in order to save gates. In order to save pins, the master IC chip 2 reads and writes directly to the SDRAM 100 DQ bus. Timing for the master IC chip 2 to access the SDRAM 100 DQ is controlled by the slave IC chip 1 control block 112, because as discussed above, the control block 212 of the second SDRAM controller 120, which would normally generate is own CLK signal, is unused. Therefore, the SDRAM 100 is managed by only one controller, the first SDRAM controller 100. Therefore, no cycles are wasted in the request or grant protocol. In addition, two mater IC chips do not have to snoop each other's states, thereby avoiding the complexity of having to maintain two separate SDRAM controllers' states synchronized. Moreover, the normal turn around time associated with closing shared memory banks is avoided, less I/O is required than synchronized dual-master IC ship configurations, and the need for resource allocation and budgeting using existing multi-port SDRAM arbitration mechanisms is negated.

Figure 4:
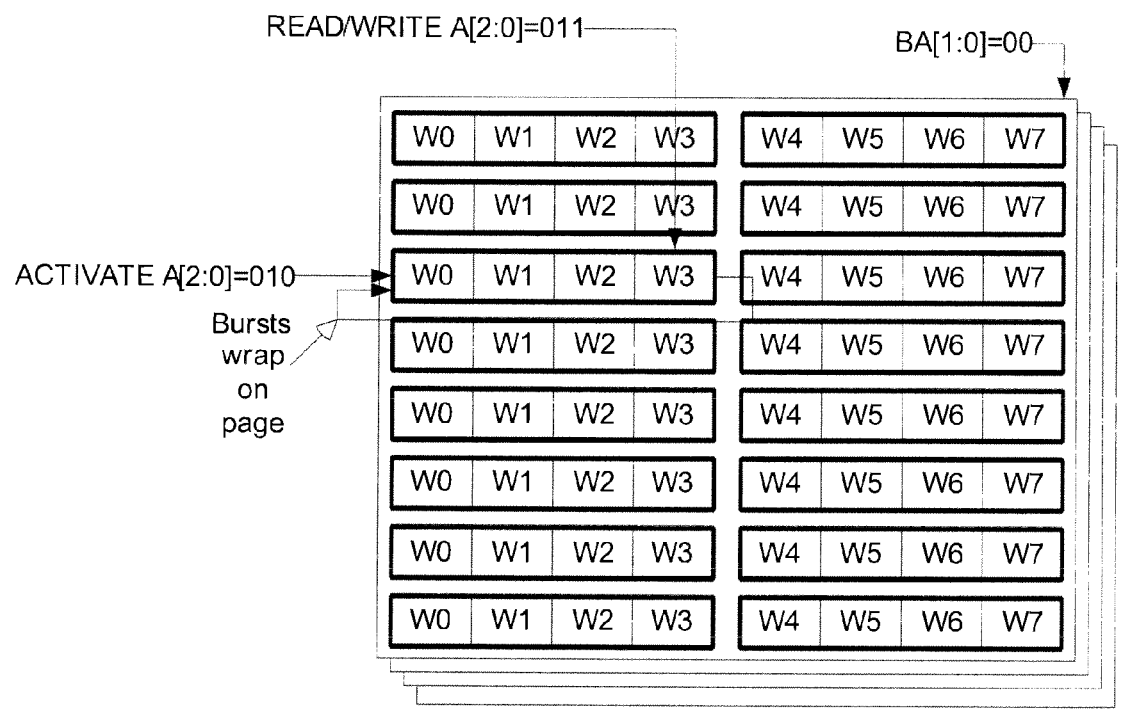
FIG. 4 is logical representation of a memory bank implemented in an SDRAM unit.

Referring to FIG. 4, an example of a memory bank array is shown. As described above, memory in an SDRAM is subdivided into banks identified by the pins BA[x-1:0]. Each bank is subdivided into rows selected/deselected by A[y-1:0] and the ACTIVATE/CLOSE command. Each bank may have a single row or "page" active at any one time. Each row is subdivided into columns (words) identified by A[z-1:0] and the READ/WRITE command. Each word in a row is grouped with neighboring words on a page. On a READ/WRITE command, subsequent data accesses are applied to the next data word within the page, wrapping on the page boundary. If a user wishes to access a new row within the bank, the previous row needs to be precharged before the new row is activated.

Figure 5:
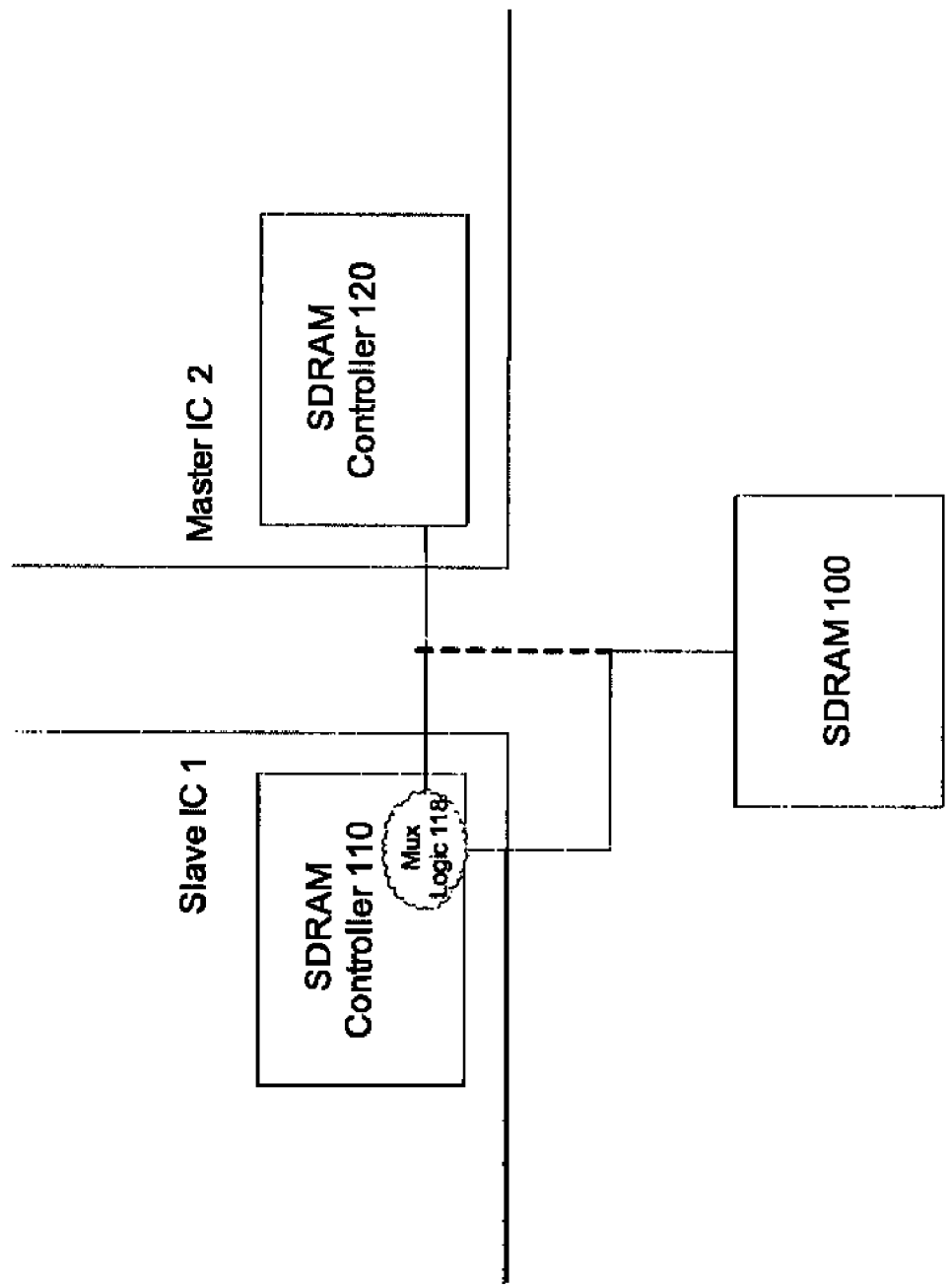
FIG. 5 is a block diagram of an electronic circuit showing an integrated, single chip multiplexer.

As discussed with regard to FIG. 1, the second SDRAM controller 120 drives or reads directly from the SDRAM 100 data bus, while control from the second SDRAM controller 120 is passed to the first SDRAM controller 110. In another embodiment of the present invention, in order for the first SDRAM controller 110 to receive and process all the control signals from the second SDRAM controller 120, a multiplexer/multiplexer logic 118 integrated into the SDRAM 110 is used, as shown in FIG. 5. It should be noted that there are no sideband signals used to arbitrate between the first and second SDRAM controllers, 110 and 120, and therefore, any application processor with a standard SDRAM interface can be utilized. Also, any commodity SDRAM can be used because the application processor and SDRAM use a standard SDRAM interface. This allows any application resident on the slave IC 1 chip, such as a Freescale Modem application, to interoperate with the best-in-class application processor, as well as use commodity memory. Although the integrated multiplexer should have better performance than an external, discrete multiplexer, the I/O count increases because, as already described, the multiplexer 118 must accept all of the second SDRAM controller 120 control signals, i.e., twenty pins as compared to two (for memory bus request (MBREQ) and memory bus grant (MBGNT)). In addition, to share the SDRAM 100 without sideband signaling, performance is slightly compromised. In particular, bursts from either the first SDRAM controller 110 or the second SDRAM controller 120 will be interrupted, and one of the first or second SDRAM controllers, 110 or 120, runs at half the normal frequency.

Figure 6:
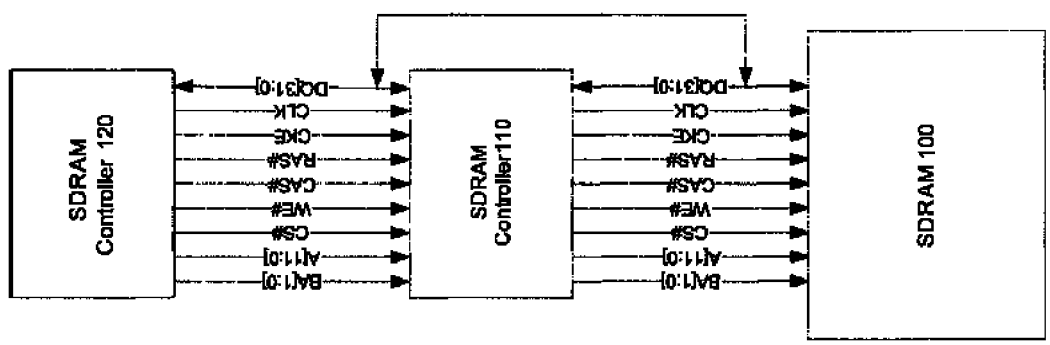
FIG. 6 is a block diagram of an electronic circuit showing the input/output interaction between a master and slave SDRAM controller and an SDRAM unit.

FIG. 6 shows another embodiment of the present invention where, unlike the embodiment discussed above in which control block 212 of the second SDRAM controller 120 is unused or nonexistent, the control from the second SDRAM controller 120 goes to the SDRAM controller 110 instead of going to the SDRAM 100. It should be noted that there is no WAIT pin on the SDRAM interfaces (not shown) of the first and second SDRAM controllers, 110 and 120, and adding one requires a modification to both the first and the second SDRAM controllers, 110 and 120. Therefore, in order to avoid control signal conflicts, the first SDRAM controller 110 terminates any active requests of its own to the SDRAM 100 if there is a request from the second SDRAM controller 120, and the request from the second SDRAM controller 120 is initiated.

Figure 7:
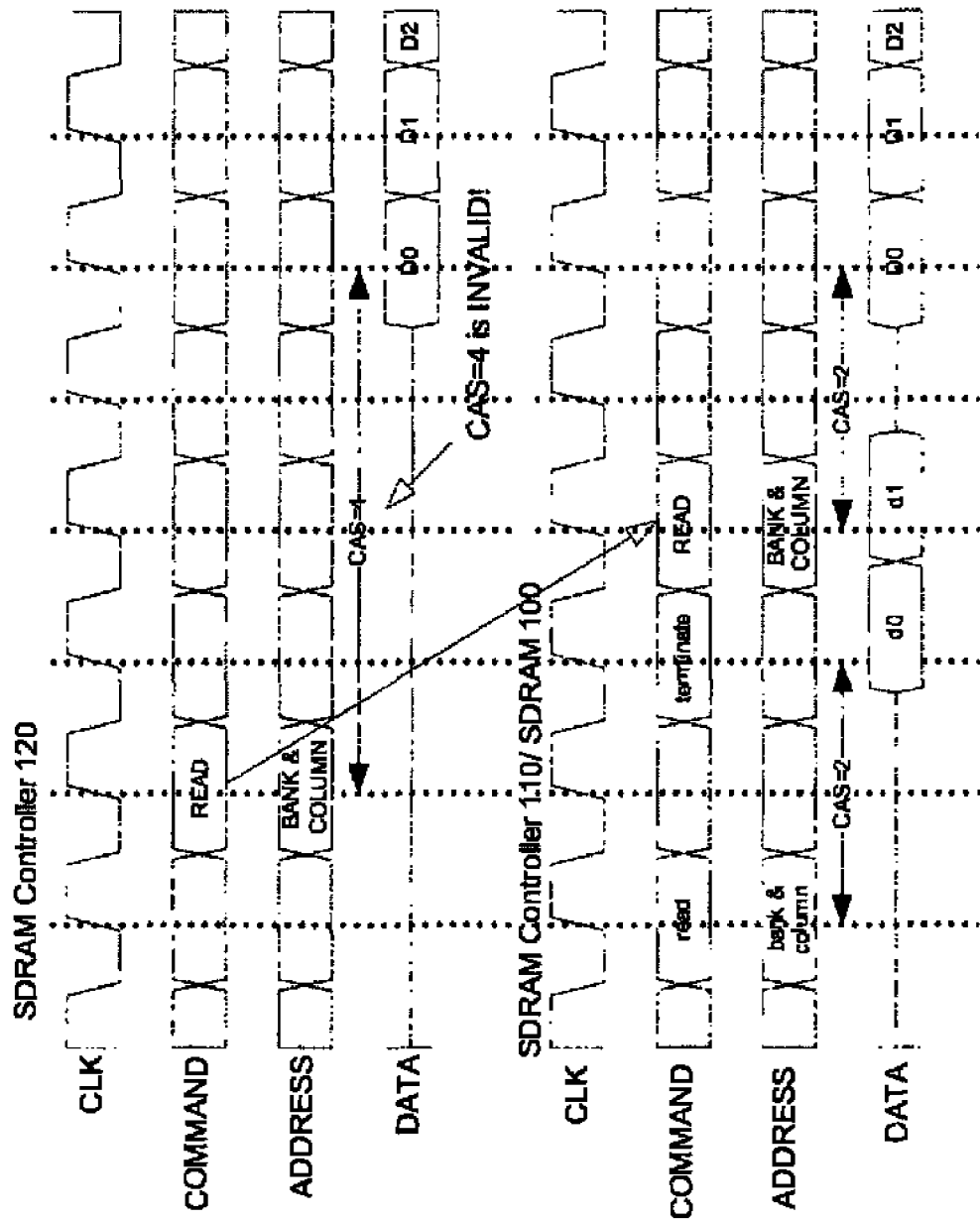
FIG. 7 is a timing diagram showing the respective cycles of an master and slave SDRAM controller and an SDRAM unit.

To describe the timing needed to effect this embodiment of the present invention, FIG. 7 shows two timing cycles for the first and second SDRAM controllers, 110 and 120. One cycle is needed to receive the second SDRAM controller 120 control, and one cycle is needed to issue a burst termination command. The burst termination command is used to terminate a burst operation, such as a burst READ or WRITE, as described above. This function can be accomplished by asserting a Burst Stop command or a Precharge command during the burst READ or WRITE operation. The Precharge command interrupts a burst cycle and closes the active bank, while the Burst Stop command terminates the existing burst operation leaving the active bank open.

For example, if the second SDRAM controller 120 issues a READ command during one rising CLK edge, the burst termination command is issued by the first SDRAM controller 110 during the rising edge of the next CLK signal. Only on the following rising edge of the next CLK signal can the SDRAM 110 issue the READ command initiated by the second SDRAM controller 120. As shown in FIG. 7, the delay, or CAS latency, between the initiation of the READ command at the second SDRAM controller 120 and the actual output of any data in response to the READ command has already reached three CLK cycles. Generally, SDRAM can only be set to one of three CAS latencies, i.e., 1, 2, or 3. Therefore, the SDRAM CAS latency must be set to 1. If the CAS latency is set to 2 or 3, the CAS latency will be 4 CLK cycles or more, which is unacceptable. However, it is also noted that when the CAS latency is set to 1, the operating frequency of the SDRAM 100 is severely limited.

Figure 8:
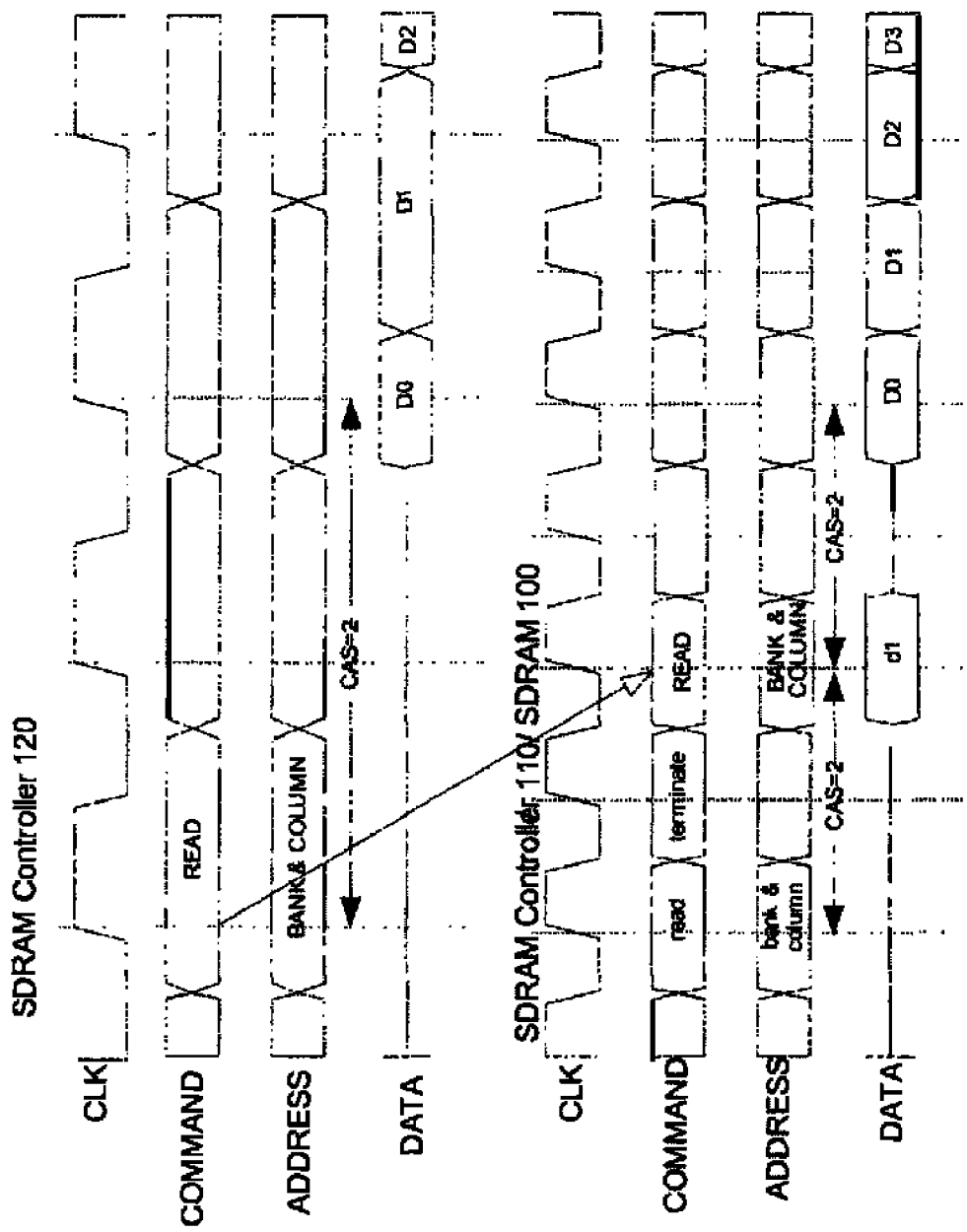
FIG. 8 is a timing diagram showing the respective cycles of an master and slave SDRAM controller and an SDRAM unit, where the cycle time of the slave SDRAM controller is adjusted according to a second embodiment of the present invention.

One solution to the timing issue is to decrease the SDRAM 120 controller CLK signal frequency as shown in FIG. 8. Doing this effectively doubles the number of cycles the first SDRAM controller 110 has to terminate its own request and issue the second SDRAM controller 120 request. However, the data must then be held for the second SDRAM controller 120. This buffering significantly increases the I/O count, i.e., data lines, as well as control lines, that have to go through the second SDRAM controller 120. In addition, data buffers have to be added to the second SDRAM controller 120 to hold the data as it arrives from the SDRAM 100. Despite this issue of buffering, such a configuration is still desirable for performance purposes because it reduces the load on the DQ bus. Furthermore, this configuration allows the SDRAM 100 to be read at its maximum speed, reducing the time the master IC chip request blocks the slave IC chip request. Lastly, the issue of how to synchronize both clocks of the first and second SDRAM controllers, 110 and 120, is avoided with this arrangement.

Figure 9:
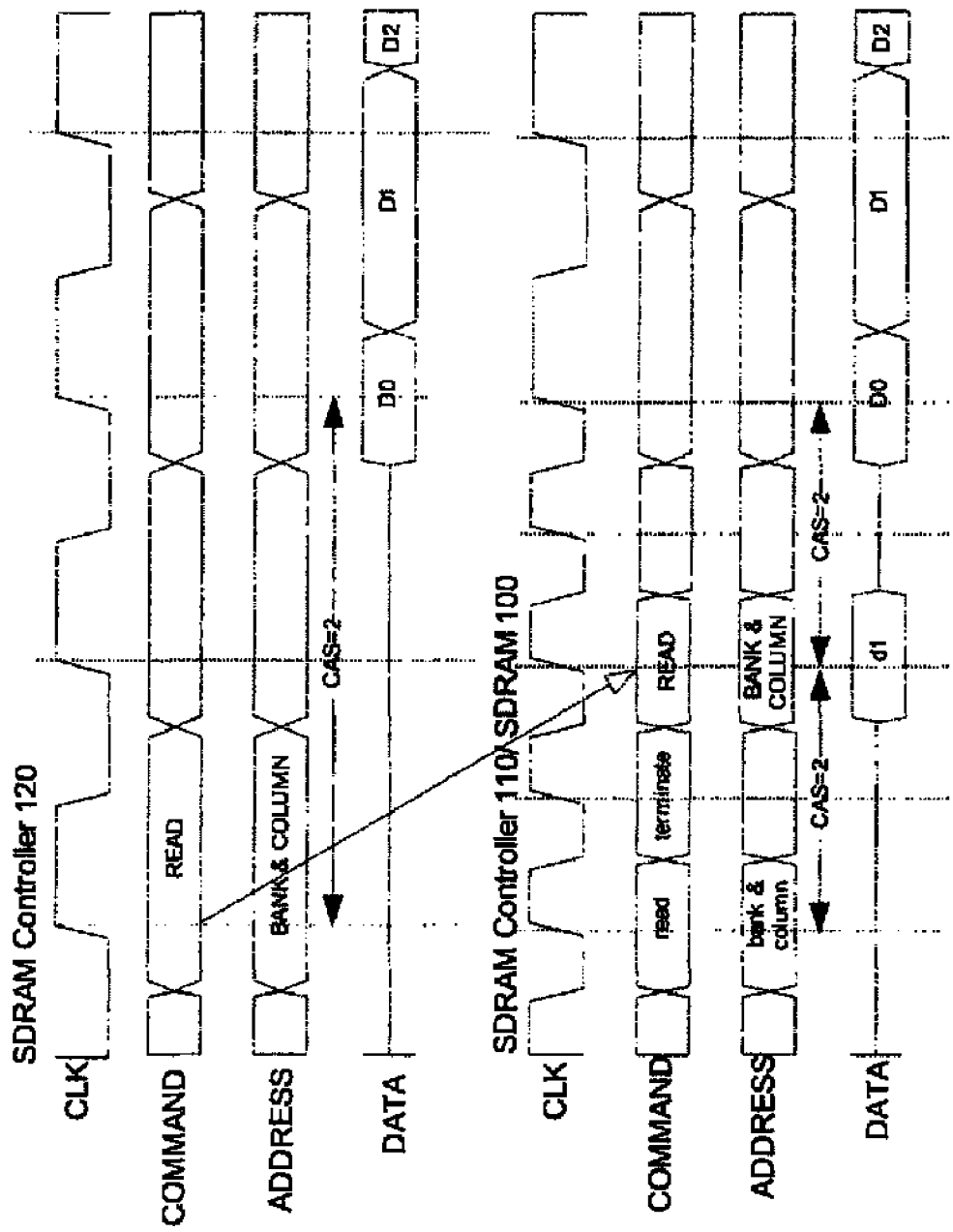
FIG. 9 is a timing diagram showing the respective cycles of an master and slave SDRAM controller and an SDRAM unit, where the cycle time of the slave SDRAM controller is adjusted according to a third embodiment of the present invention.

Another solution to the timing issue involves decreasing the SDRAM 100 CLK signal frequency when data is to be output for the second SDRAM controller 120, as shown in FIG. 9. In other words, the SDRAM 100 clock can be gated to provide data to the second SDRAM controller 120 at the second SDRAM controller 120's own data rate. This configuration allows the second SDRAM controller 120 to drive the DQ directly, and as a result, no data has to be buffered, and I/O is saved on the first SDRAM controller 110. However, a "clock skewing" issue arises in this configuration. To synchronize the clocks of the SDRAM controllers, 110 and 120, the first SDRAM controller 110 is run off of the second SDRAM controller 120 clock at the time of data transfer.

Figure 10:
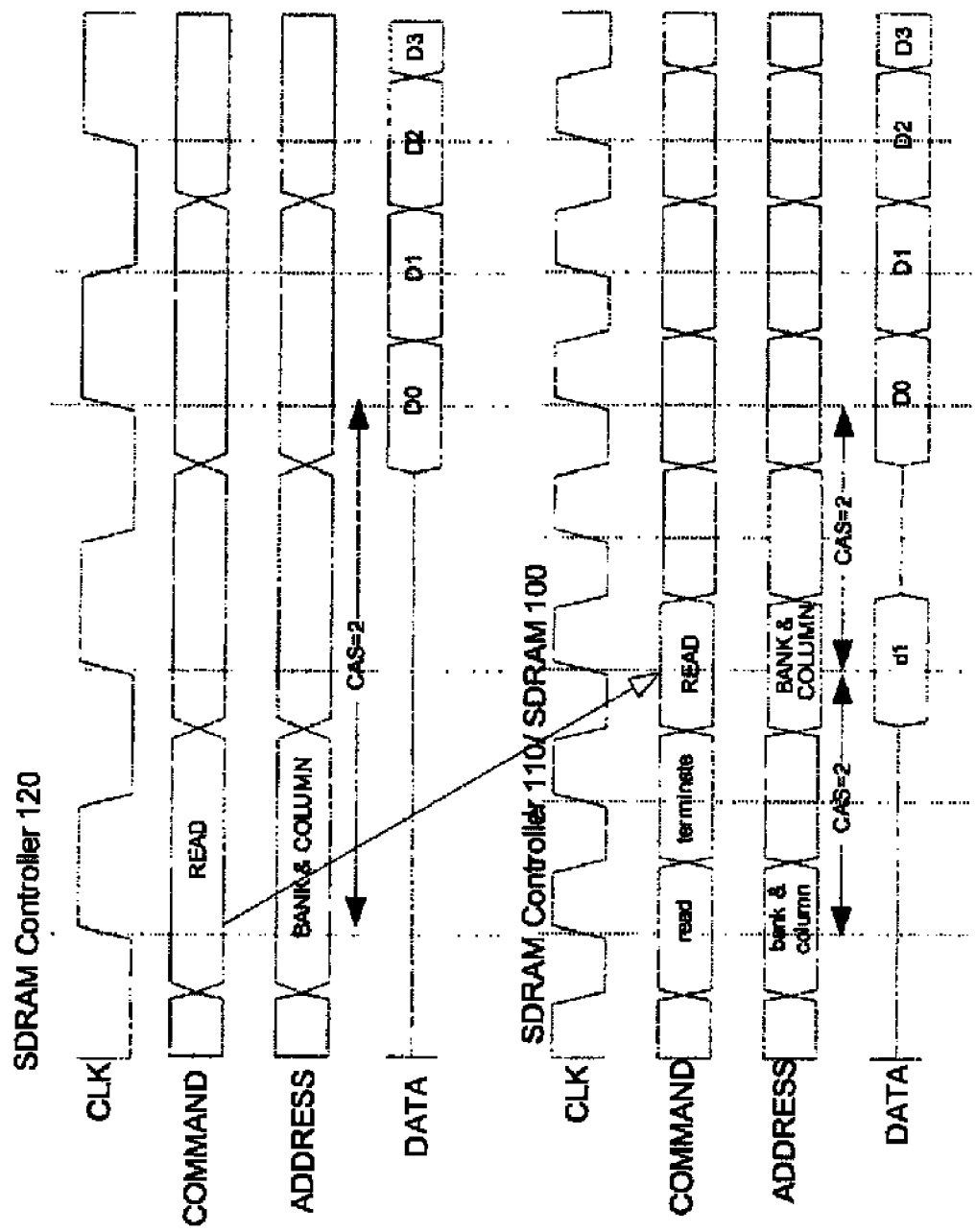
FIG. 10 is a timing diagram showing the respective cycles of an master and slave SDRAM controller and an SDRAM unit, where the cycle time of the slave SDRAM controller is adjusted according to a fourth embodiment of the present invention.

Yet another solution to the timing issue is shown in FIG. 10, where the second SDRAM controller 120 is configured as a double-data-rate (DDR) SDRAM. A DDR SDRAM achieves greater bandwidth than ordinary SDRAM by transferring data on both the rising and falling edges of the CLK signal (double pumped). This effectively doubles the transfer rate without increasing the frequency of the front side bus. Thus, a 100 MHz DDR system has an effective clock rate of 200 MHz when compared to a conventional SDRAM. In treating the SDRAM 100 as a DDR SDRAM, the half rate clock used on the rising and falling edges of the CLK signal is matched to the full rate clock that would be used on a single edge. The second SDRAM controller 120 provides its clock to the first SDRAM controller 110 using a Phased Locked Loop (PLL) version of the second SDRAM controller 120 clock. This avoids any clock synchronization issues, and therefore, the second SDRAM controller 120 can take drive and read data directly from the SDRAM 100, and on the control is handled by the first SDRAM controller 110. In addition, no buffering of data, and no extra DQ pins on the first SDRAM controller 110 are required, although it should be noted that not all companion chip SDRAM controllers are able to support DDR.

The various embodiments are described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software implementations of the present invention could be accomplished with standard programming techniques with rule based logic and other logic to accomplish the various database searching steps, correlation steps, comparison steps and decision steps. It should also be noted that the word "block" as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of sharing synchronous dynamic random access memory, comprising:
    partitioning a first synchronous dynamic random access memory controller into a control block and a data block;
    configuring the first synchronous dynamic random access memory controller to receive at least one data request from the control block of the first synchronous dynamic random access memory controller and at least one data request from a second synchronous dynamic random access memory controller;
    driving a clock signal used by both of the first and second synchronous dynamic random access memory controllers from the control block of the first synchronous dynamic random access memory controller; and
    controlling the synchronous dynamic random access memory using control signals from the control block of the first synchronous dynamic random access memory controller.

2. The method of claim 1, wherein the at least one data request received from the second synchronous dynamic random access memory controller is received over a system bus communicatively connecting the first and second synchronous dynamic random access memory controllers.

3. The method of claim 1, wherein the second synchronous dynamic random access memory controller shares a data bus with the synchronous dynamic random access memory.

4. The method of claim 1, wherein the controlling of the synchronous dynamic random access memory further comprises using sideband signaling by the second synchronous dynamic random access memory controller to inform the first synchronous dynamic random access memory controller of the at least one data request from the second synchronous dynamic random access memory controller.

5. The method of claim 4, wherein the sideband signaling is communicated to the first synchronous dynamic random access memory using a sideband port of the first synchronous dynamic random access memory and wherein the sideband port is configured to receive bank address, activate/close, read/write, clock, clock enable, column address select, row address select, write enable, and chip select signals.

6. The method of claim 1, wherein upon receipt of a data request from the second synchronous dynamic random access memory controller, any active data requests by the first synchronous dynamic random access memory controller are terminated.

7. The method of claim 6, wherein the terminating of any active data requests further comprises:

doubling a number of clock signal cycles the first synchronous dynamic random access memory controller has to terminate its own active data requests; and configuring the second synchronous dynamic random access memory controller to buffer data as it arrives from the synchronous dynamic random access memory.

8. The method of claim 6, wherein the terminating of any active data requests further comprises:

decreasing a clock signal frequency of the synchronous dynamic random access memory; and providing the clock signal from the first synchronous dynamic random access memory controller to the second synchronous dynamic random access memory controller.

9. The method of claim 6, wherein the terminating of any active data requests further comprises configuring the second synchronous dynamic random access memory controller to treat the synchronous dynamic random access memory as double-data-rate synchronous dynamic random access memory.

10. A synchronous dynamic random access memory controller comprising:

a control block configured to transmit at least one of a plurality of control signals to a synchronous dynamic random access memory;

a data block configured to transmit and receive data to and from the synchronous dynamic random access memory, and receive a clock signal from one of the control block and an off-chip synchronous dynamic random access memory controller; and a system interface configured to receive on-chip data requests and to receive off-chip data requests from the off-chip synchronous dynamic random access memory controller; and wherein the control block is configured to control the synchronous dynamic random access memory for both the on-chip data requests and the off-chip data requests.

11. The synchronous dynamic random access memory controller of claim 10, wherein the synchronous dynamic random access memory controller is configured to share a data bus with a synchronous dynamic random access memory and the off-chip synchronous dynamic random access memory controller.

12. The synchronous dynamic random access memory controller of claim 11, wherein the synchronous dynamic random access memory controller is configured to control the synchronous dynamic random access memory.

13. The synchronous dynamic random access memory controller of claim 10, further configured to receive at least one of a plurality of control signals from off-chip synchronous dynamic random access memory controller.

14. The synchronous dynamic random access memory controller of claim 10, wherein upon receipt of a data request from the off-chip synchronous dynamic random access memory controller, any active data requests by the synchronous dynamic random access memory controller are terminated.

15. The synchronous dynamic random access memory controller of claim 14, wherein the terminating of any active data requests further comprises:

doubling a number of clock signal cycles the synchronous dynamic random access memory controller has to terminate its own active data requests; and configuring the off-chip synchronous dynamic random access memory controller to buffer data as it arrives from a synchronous dynamic random access memory communicatively connected to the synchronous dynamic random access memory controller.

16. The synchronous dynamic random access memory controller of claim 14, wherein the terminating of any active data requests further comprises:

decreasing a clock signal frequency of a synchronous dynamic random access memory communicatively connected to the synchronous dynamic random access memory controller; and providing a clock signal from the synchronous dynamic random access memory controller to the off-chip synchronous dynamic random access memory controller.

17. The synchronous dynamic random access memory controller of claim 14 wherein the terminating of any active data requests further comprises, configuring the off-chip synchronous dynamic random access memory controller to treat the synchronous dynamic random access memory communicatively connected to the synchronous dynamic random access memory controller as double-data-rate synchronous dynamic random access memory.

18. A system for sharing synchronous dynamic random access memory, comprising:

a first synchronous dynamic random access memory controller partitioned into a control block and a data block;

a second synchronous dynamic random access memory controller communicatively connected to the first synchronous dynamic random access memory controller, wherein the first synchronous dynamic random access memory controller is configured to receive at least one data request from the control block of the first synchronous dynamic random access memory controller and at least one data request from the second synchronous dynamic random access memory controller; and a synchronous dynamic random access memory communicatively connected to the first and the second synchronous dynamic random access memory controllers, wherein a data bus is shared by the first and the second synchronous dynamic random access memory controllers and the synchronous dynamic random access memory;

a clock signal used by the first and the second synchronous dynamic random access memory controllers is driven by the control block of the first synchronous dynamic random access memory controller; and the control block of the first synchronous dynamic random access memory controller is used to control the synchronous dynamic random access memory for both the at least one data request from the control block of the first synchronous dynamic random access memory controller and the at least one data request from the second synchronous dynamic random access memory controller.

19. The system of claim 18, wherein the first synchronous dynamic random access memory controller is configured to terminate any active data requests of the first synchronous dynamic random access memory controller in response to receiving a data request from the second synchronous dynamic random access memory controller.

20. The method of claim 1, wherein the controlling of the synchronous dynamic random access memory using control signals from the control block of the first synchronous dynamic random access memory controller comprises controlling the synchronous dynamic random access memory using the control signals from the control block of the first synchronous dynamic random access memory controller for both the at least one data request from the control block of the first synchronous dynamic random access memory controller and the at least one data request from the second synchronous dynamic random access memory controller.

* * * * *